June 3, 1924.
P. L. BILLINGSLEY
CIRCLE SAWING MACHINE
Filed March 30, 1922
1,496,618
3 Sheets-Sheet 1
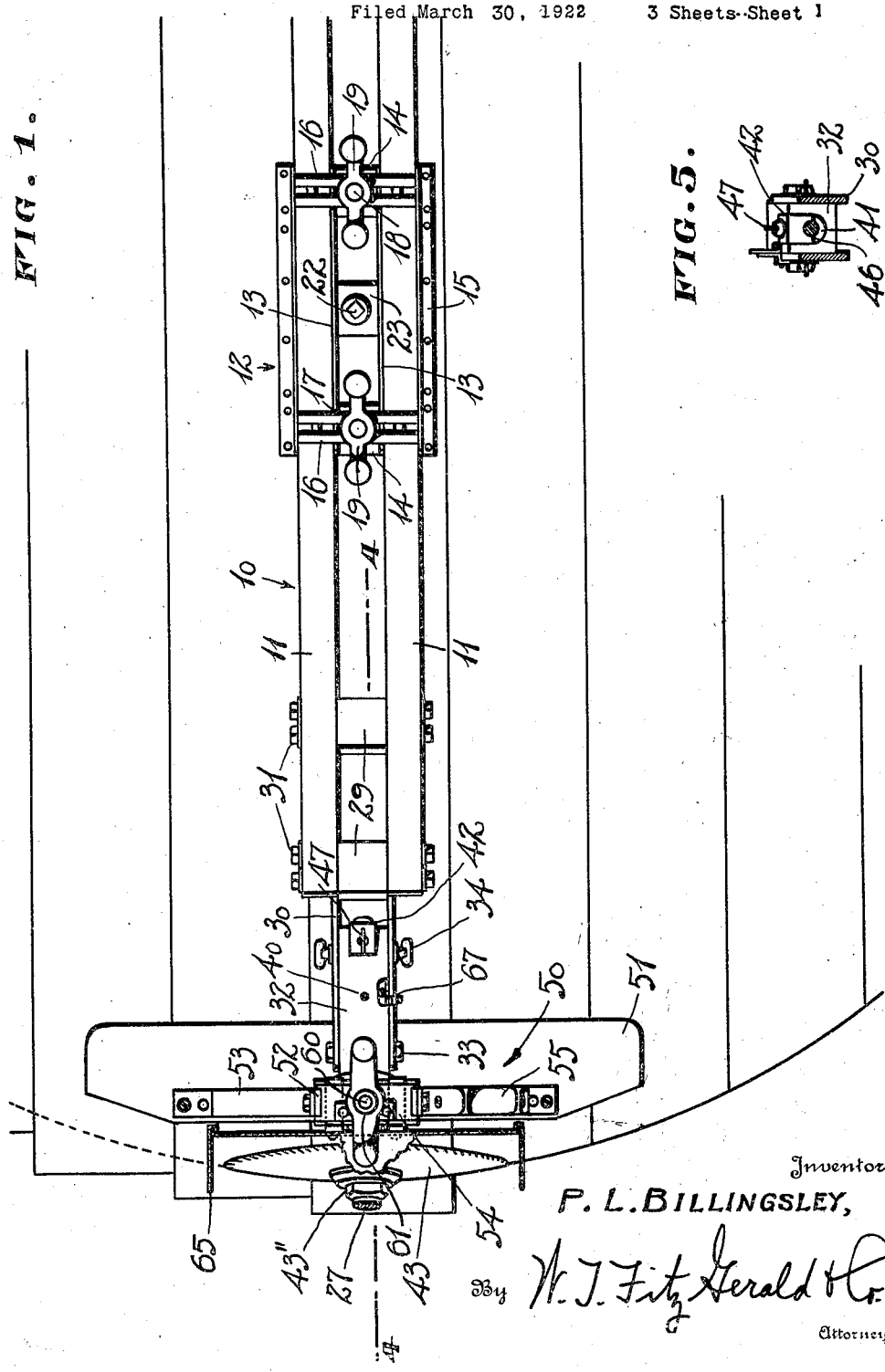
Inventor:
P. L. BILLINGSLEY,
By W. J. FitzGerald
Attorney.

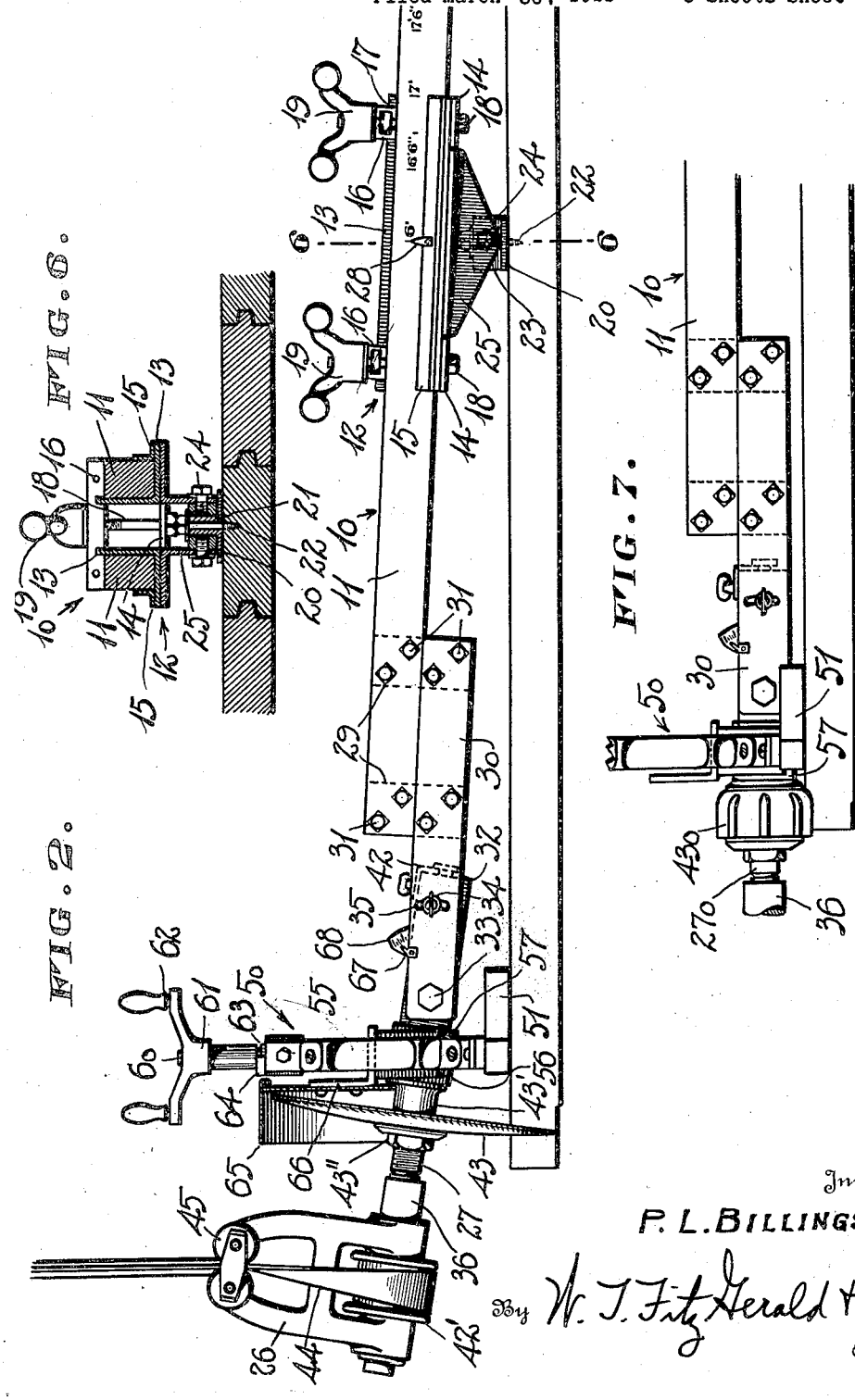

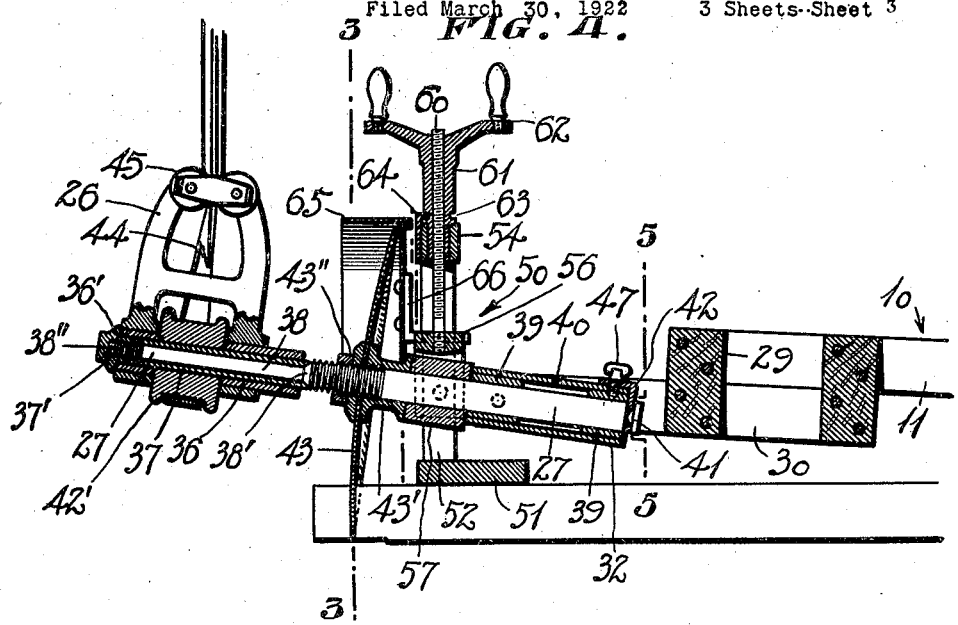
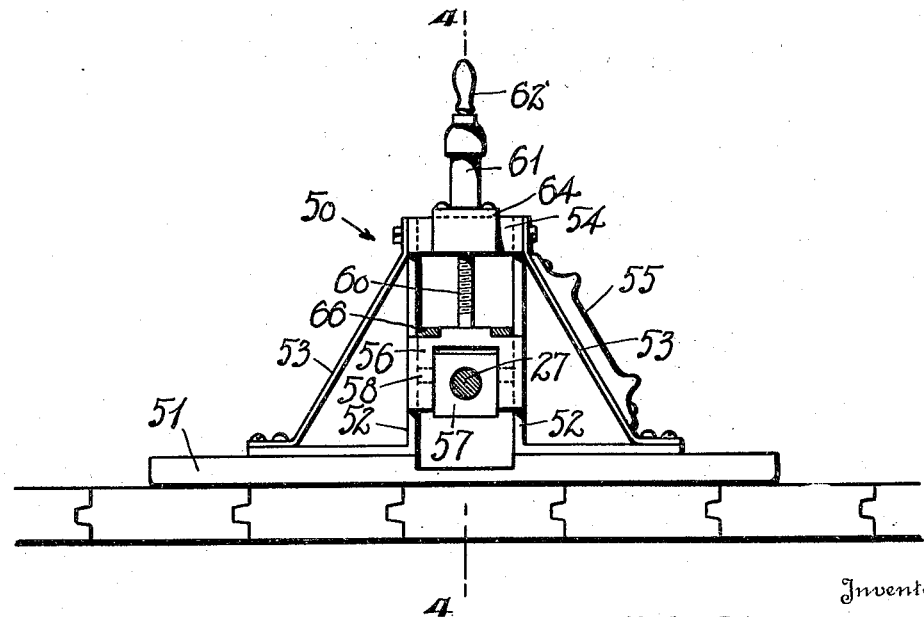

Patented June 3, 1924.

1,496,618

UNITED STATES PATENT OFFICE.

PERCY L. BILLINGSLEY, OF CINCINNATI, OHIO.

CIRCLE-SAWING MACHINE.

Application filed March 30, 1922. Serial No. 548,135.

*To all whom it may concern:*

Be it known that I, PERCY L. BILLINGSLEY, a citizen of the United States, residing at Cincinnati, in the county of Hamilton and State of Ohio, have invented certain new and useful Improvements in Circle-Sawing Machines; and I do hereby declare the following to be a full, clear, and exact description of the invention, such as will enable others skilled in the art to which it appertains to make and use the same.

The present invention relates generally to sawing machines, and more especially to such machines for making circular or arcuate cuts.

It is the primary object of the invention to provide a novel and improved machine for making circular and arcuate cuts, such as for the purpose of conveniently and expeditiously sawing the circular bottoms of tanks, and the like.

Another object is the provision of such a machine including novel means for mounting and guiding the saw for circular movement, and for the adjustment of the saw to regulate the radius of the cut and also the angle of the cut for square or bevelled edges.

A further object is the provision of such a machine for using different saws and cutters interchangeably for various kinds of work, and enabling the margin of the tank bottom to be chamfered or chimed after being sawn.

A still further object is the provision of such a circular sawing machine adapted to be driven by the flexible operating mechanism disclosed in my Patent No. 1,395,626, granted November 1, 1921, and my copending application Serial No. 470,413, filed May 17, 1921.

With the foregoing and other objects in view, which will be apparent as the description proceeds, the invention resides in the construction and arrangement of parts, as hereinafter described and claimed, it being understood that changes can be made within the scope of what is claimed, without departing from the spirit of the invention.

The invention is illustrated in the accompanying drawings, wherein—

Figure 1 is a plan view of the device as in operation.

Fig. 2 is a side elevation thereof, portions being broken away.

Fig. 3 is a side elevation of the carriage, partly in section on the line 3—3 of Fig. 4.

Fig. 4 is a vertical section on the line 4—4 of Fig. 3, portions being shown in elevation, and showing the saw arbor and associated parts.

Fig. 5 is a cross section on the line 5—5 of Fig. 4.

Fig. 6 is a cross section on the line 6—6 of Fig. 2.

Fig. 7 is a view somewhat similar to Fig. 2, showing the chamfering or chiming cutter substituted for the saw, portions being removed.

The machine includes a radius arm 10 for scribing the circle or arc, and such arm is composed of a pair of parallel reach bars 11 of wood or other suitable material held in a rocking and rotatably mounted clamp 12. Said clamp has the angle members 13 with lower outstanding flanges on which the bars 11 rest and inner upstanding flanges against which the adjacent sides of the bars bear, as seen in Fig. 6. Cross bars 14 are secured to the members 13 at the ends thereof, and angle bars 15 are secured on the lower flanges of the members 13 adjacent to the edges thereof to bear against the opposite sides of the bars 11 and thus hold the bars snugly in place against the upstanding flanges of said members 13, to guide the bars for longitudinal movement through the clamp 12 for the adjustment of the arm 10 for different radii. The bars 11 are clamped on the lower flanges of the members 13 by a pair of clamping bars or members 16 disposed transversely across the bars 11 and upwardly projecting flanges of the members 13, and fitted in notches 17 in said flanges to retain said clamping members 16 in place. Bolts 18 extend upwardly through the cross bars 14 and clamping members 16, and have nuts 19 on their upper terminals bearing on the members 16, whereby when the nuts are tightened, the members 16 will clamp the bars 11 tightly down on the lower flanges of the members 13, thereby maintaining the adjustment. The bars 11 can be of suitable length, to provide for a wide range of adjustments.

The arm 10 turns around a central pivot, and, for this purpose, the clamp 12 is mounted for rotation about a vertical axis. Thus, a pivot base 20 is seated on the tank bottom or other object to be cut, and has an upstanding pivot stud 21 through which a securing screw 22 is inserted from above for fastening said base down. A bearing 23 is fitted for rotation on the stud 21, being retained on said stud by the screw 22, and opposite trunnions or screws 24 are engaged in the bearing 23 for mounting the clamp 12 for rocking movement on the rotatable bearing. Angle members 25 are secured to the under surfaces of the members 13 between the cross bars 14 and the depending flanges thereof engage the trunnions or pivots 24, whereby the clamp 12 can rock or tilt about a transverse axis, and can also rotate about a vertical axis. The lower flanges of the members 13, upper flanges of the members 25 and angle bars 15 are preferably riveted together at their edges, to constitute a frame for the clamp 12, including the cross bars 14, which are similarly secured to the members 13 and bars 15. A pointer or index 28 is carried by one guide bar 15, to cooperate with suitable graduations on the corresponding bar 11, for indicating the adjustments made, and for conveniently adjusting the arm 10 for cutting on the desired radius. The arm 10 can thus be swung upwardly and downwardly with the clamp 12 about the transverse axis of the trunnions 24, and the arm can turn with the clamp around the vertical axis of the pivot stud 21 in the various adjustments of said arm.

The outer end of the arm has means for the attachment of a saw or cutter. A pair of substantially vertical blocks or pieces 29 are disposed between the bars 11 at the outer terminals thereof, and parallel strips 30 bear against the opposite sides of the blocks 29 below the bars 11, bolts 31 extending through the parts to clamp the bars 11 and strips 30 to the blocks. The strips 30 project outwardly beyond the bars 11 and a boxing 32 is disposed between the projecting terminals of the strips 30, and is pivoted at opposite sides near the outer end of the boxing to the strips, by means of pivot screws 33, or the like, thereby enabling the boxing to be turned or tilted about the transverse axis of the pivots 33. Wing screws 34 are carried by the opposite sides of the boxing near the inner end thereof and work in arcuate slots 35 in the strips 30, to permit of the swinging adjustment of the boxing, and said screws, when tightened, will clamp the boxing in its adjusted position. Bearings or bushings 39 are fitted or secured within the end portions of the boxing 32 for receiving the saw arbor or spindle 27, and the boxing has an oil chamber between the bushings for containing a lubricant, which can be injected through the lubricant aperture or hole 40 in the top of the boxing.

The inner terminal of the arbor 27 has an annular groove 41 for the engagement of a latch or retainer 42 mounted on the boxing 32. Said latch is of angular shape, with one flange resting on the top of the boxing, and the other flange depending partially across the inner end of the boxing and notched, as at 46, to engage in the groove 41, thereby holding the arbor 27 in the boxing. A clamping wing screw 47 extends through the upper flange of the latch and into the boxing, for clamping the latch in place, and when the screw is loosened, the latch can be raised to disengage it from the arbor so that the arbor can be withdrawn.

The saw 43 is circular and dished or concavo-convex, with its concaved side facing the center of turning movement of the arm 10, in order that the saw is curved substantially the same as the cut made. Different sizes and curvatures of saws can be used for different conditions and radii of cuts. The saw 43 is fitted on the arbor between the ends thereof, and is secured in place between a pair of collars or nuts 43' and 43" threaded on the arbor, the arbor having a conical or bevelled shoulder 38' outwardly beyond the screw-threads, and a stem 38 of reduced diameter projecting outwardly beyond said shoulder and formed with a threaded terminal 38" for the attachment of the arbor of the flexible driving or operating mechanism, such as disclosed in the patent and application hereinbefore referred to. Such mechanism is preferably used for driving the saw or cutter of the present machine, and only the freely movable terminal portion of such mechanism is shown in the present drawings. Such mechanism includes a terminal yoke 26 which has bushings 36 and 36' secured in the terminals thereof, and a tubular spindle or arbor 37 is fitted for rotation in said bushings. A pulley wheel 42' is secured on the spindle 37 between the bushings for retaining the spindle in place, and a belt 44 passes around said pulley wheel for rotating said spindle, and is guided between the rollers 45. The stem 38 of the saw arbor 27 is received by the tubular spindle 37, and the threaded terminal 38" of the stem is screw-threaded into the screw-threaded portion 37' of the spindle 37 near one end thereof, the other end of the spindle bearing against the shoulder 38'. The stem 38 of the arbor is thus fitted in and secured to the tubular spindle 37 of the operating mechanism, for driving the saw, and the operating mechanism and saw arbor are readily detached by reversing the rotation of either the saw arbor or spindle 37.

A carriage is provided for mounting and supporting the outer end of the arm 10 and arbor 27, and is designated generally at 50. Such carriage includes a runner or shoe 51 on which a pair of guide standards or uprights 52 are secured, with braces 53 between the upper ends of said standards and runner or shoe. A yoke 54 is secured between the upper ends of the standards and braces, and said standards provide a vertical guide for a slide 56. A suitable handle 55 is secured to one brace 53 to be grasped by the hand for conveniently moving the carriage and saw, thereby enabling the saw to be fed manually. A bearing 57 through which the arbor 27 is inserted is mounted in an opening of the slide 56, and has trunnions or pivots 58 at its opposite sides, mounting the bearing in the slide for turning movement about a transverse horizontal axis, similar to the boxing or socket member 32. The bearing 57 is disposed between the outer end of the boxing or socket member and saw, with the inner end of the bearing 57 abutting the outer end of the boxing 32 or outer bushing 39, and the outer end of the bearing abutting the inner collar or nut 43', as seen in Fig. 4.

The slide 56 is raised and lowered by means of an upwardly extending screw 60 secured to the slide 56 and passing slidably through the yoke 54, with a nut 61 threaded on the screw and bearing on the yoke. As shown, the nut 61 has a pair of crank handles 62 for conveniently rotating the nut to adjust the slide 56 vertically, to either raise or lower the outer end of the arm 10, boxing 32, arbor 27, and saw 43. The nut 61 has an annular groove 63 engaged by a retaining member 64 secured on the yoke 54 for holding the nut 61 down in place, and the nut can be fitted in the yoke for turning movement, as shown.

A guard or shield 65 is preferably mounted over the saw 43, being secured to angle brackets 66 secured on the slide 56, to avoid injury or damage to objects or the operator coming into contact with the saw from above.

Fig. 7 shows a chamfering or chiming cutter 430 on an arbor 270 which is a duplicate of the arbor 27, and which has the same provision for the connection of the flexible operating mechanism. Different sizes and styles of saws and cutters, each mounted on an arbor, can thus be used interchangeably.

In using the device, such as for the purpose of sawing a tank bottom, or the like, the boards or planks are fitted and secured together, and the pivot base 20 is then secured thereto at the center. The slide 56 is in raised position, when starting, so that the saw 43 is above the wood, and the angular position of the saw with reference to the plane or approximate plane of movement of the radius arm, when making the cut, is determined by the adjustment of the boxing or member 32, so that either a square or bevelled edge can be cut. Furthermore, owing to the concaved side of the saw facing the edge of the cut bottom, it may be necessary to adjust the arbor 27 to an angular or inclined position, to make a vertical or square cut. Then, when the saw is being driven by the flexible operating mechanism, the nut 61 is turned so as to let the slide 56 and saw arbor gravitate, and the saw will cut its way down through the wood. After the saw has been lowered the desired amount to cut through the wood, the carriage 50 is then moved by grasping the handle 55, so that the saw will cut on the arcuate or circular line, thereby cutting off the boards and producing a circular bottom having a true and finished edge. The tank bottom can thus be cut in a few moments time, whereas ordinary methods require considerable trouble and time.

The edge portion of the tank bottom can then be conveniently chamfered or chimed. To do this, the slide 56 is raised, for raising the saw, it being noted that the arm 10, boxing 32, and saw arbor are adjusted upwardly and downwardly as a unit with the slide 56. The latch 42 is then released from the arbor 27, and the arbor can then be withdrawn from the boxing 32 and bearing 57 of the arm 10 and carriage 50, respectively. It is then a simple matter to insert the arbor 270 through the bearing 57 and boxing 32, and the latch 42 is then engaged with the arbor 270, as seen in Fig. 7. The latch, when engaging either arbor, will hold the parts assembled, with the arbor anchored by a swivel connection with the boxing, and the bearing 57 of the carriage is snugly held between the boxing and saw or cutter. The arrangement is such, that when the saw arbor is removed and replaced by the cutter arbor 270, no radial adjustment is necessary, although the boxing 32 may have to be adjusted to a different angular position, as seen in Fig. 7, when compared with Fig. 4. The arbor 270 is driven by the operating mechanism, the same as the saw arbor, and the slide 56 is let down, to bring the chamfering or chiming cutter 430 into proper engagement with the edge portion of the tank bottom, after which the carriage and cutter are moved around the edge of the bottom to produce the annular chamfer or chime. Thus, not only can the circular cut be made quickly and conveniently, but, furthermore, by substituting the saw arbor by the cutter arbor, with only a possible slight adjustment of the boxing 32, the edge portion of the tank bottom can be chamfered or chimed quickly.

So far as the operation is concerned, the chamfering or chiming cutter 430 is substantially the equivalent of the rotary saw 43, excepting that they perform separate duties, although the machine is used substantially the same for each, and the term "saw" used in the claims is used in a sufficiently broad sense to include the cutter or similar rotary member.

Having thus described the invention, what is claimed as new is:—

1. A circle sawing machine including a radius arm, means for mounting said arm to turn about an axis perpendicular to the object to be operated on, and a saw carried by said arm to cut said object along a circular line around said axis, said saw being adjustable relatively to said arm for positioning the saw at different angles whereby the circular cut made can be at different angles relatively to said object for square and bevel cuts.

2. A circle sawing machine including a radius arm, means for mounting said arm to turn about an axis perpendicular to the object to be operated on, a boxing carried by said arm, and a rotary saw having an arbor journaled in said boxing so that the saw will cut said object along a circular line around said axis, said boxing being adjustable relatively to said arm for adjusting the angle of the saw relatively to the arm and changing the angle of the circular cut made by the saw relatively to the object for square and bevel cuts.

3. A circle sawing machine including a radius arm, means for mounting said arm to turn about an axis perpendicular to the object to be operated on, a boxing pivotally connected to said arm, and a rotary saw having an arbor journaled in said boxing so that the saw is movable with said arm to cut the object along a circular line around said axis, said boxing being adapted to be turned relatively to the arm about an axis transversely of said arm for positioning the saw at different angles so that the circular cut made by the saw can be at different angles relatively to the object for square and bevel cuts.

4. A circle sawing machine including a radius arm, means for mounting said arm to turn about an axis perpendicular to the object to be operated on, a saw carried by said arm to cut said object along a circular line around said axis, and adjustable means to move upon the object for spacing said saw and the corresponding portion of the arm different distances from said object.

5. A circle sawing machine including a radius arm, means for mounting said arm to turn about an axis perpendicular to the object to be operated on, a saw carried by said arm to cut said object along a circular line around said axis, and a carriage movable upon said object and having adjustable means for spacing said saw and the corresponding portion of the arm different distances from the object.

6. A circle sawing machine including a radius arm, means for mounting said arm to turn about an axis perpendicular to the object to be operated on, a rotary saw having an arbor carried by said arm so that the saw will cut the object along a circular line around said axis, and a carriage movable upon said object and having an adjustable bearing engaging said arbor for spacing the arbor and the corresponding portion of said arm different distances from the object.

7. A circle sawing machine including a radius arm, means for mounting said arm to turn about an axis perpendicular to the object to be operated on, a boxing carried by said arm, a rotary saw having an arbor journaled in said boxing so that the saw will cut said object along a circular line around said axis, and a carriage movable upon the object and having an adjustable bearing engaging said arbor to space the arbor and the corresponding portion of said arm different distances from the object, said arbor connecting the bearing and boxing.

8. A circle sawing machine including a radius arm, means for mounting said arm to turn about an axis perpendicular to the object to be operated on, a boxing carried by said arm, a carriage movable upon said object and having an adjustable bearing to register with said boxing, a rotary saw having an arbor fitted in said bearing and boxing for the movement of the saw with said arm to cut said object along a circular line around said axis, said bearing spacing said arbor and the corresponding portion of said arm different distances from the object, the arbor holding the carriage and arm assembled, and means engaging the arbor for holding the saw, bearing and boxing together and enabling them to be separated.

9. A circle sawing machine including a radius arm, means for mounting said arm to turn about an axis perpendicular to the object to be operated on, a saw carried by said arm to cut the object along a circular line around said axis, said saw being adjustable relatively to said arm for positioning the saw at different angles whereby the circular cut can be at different angles relatively to said object for square and bevel cuts, and adjustable means for spacing said saw and the corresponding portion of the arm different distances from the object.

10. A circle sawing machine including a radius arm, means for mounting said arm to turn about an axis perpendicular to the object to be operated on, a saw carried by said arm to cut the object along a circular line around said axis, said saw being adjustable relatively to said arm for positioning the saw at different angles whereby the circular cut can be at different angles relatively to said object for square and bevel cuts, and a carriage movable upon said object and having adjustable means for spacing said saw and the corresponding portion of the arm different distances from the object.

11. A circle sawing machine including a radius arm, means for mounting said arm to turn about an axis perpendicular to the object to be operated on, a boxing carried by said arm, a rotary saw having an arbor journaled in said boxing so that the saw will cut said object along a circular line around said axis, said boxing being adjustable relatively to said arm and changing the angle of the circular cut made by the saw relatively to said object for square and bevel cuts, and a carriage movable upon said object and having an adjustable bearing engaging said arbor for spacing the arbor and the corresponding portion of said arm at different distances from the object.

12. A circle sawing machine including a radius arm, means for mounting said arm to turn about an axis perpendicular to the object to be operated on, a boxing pivotally connected to said arm, a rotary saw having an arbor journaled in said boxing so that the saw is movable with said arm to cut the object along a circular line around said axis, said boxing being adapted to be turned relatively to the arm about an axis transversely of said arm for positioning the saw at different angles so that the circular cut made by the saw can be at different angles relatively to said object for square and bevel cuts, and a carriage movable upon said object having a bearing engaging said arbor and adjustable to space the arbor and the corresponding portion of said arm different distances from the object, said bearing also being adjustable angularly to aline and register with said boxing in the different angular adjustments of said boxing relatively to said arm.

13. A circle sawing machine including a radius arm, means for mounting said arm to turn about an axis perpendicular to the object to be operated on, a boxing pivotally connected to said arm, a rotary saw having an arbor journaled in said boxing so that the saw is movable with said arm to cut the object along a circular line around said axis, said boxing being adapted to be turned relatively to the arm about an axis transversely of said arm for positioning the saw at different angles so that the circular cut made by the saw can be at different angles relatively to said object for square and bevel cuts, a carriage movable upon said object, a slide carried by the carriage adjustable toward and away from the object, and a bearing carried by the slide for adjustment to different angular positions to aline and register with said boxing, said bearing engaging said arbor for spacing the arbor and the corresponding portion of said arm different distances from the object.

14. A circle sawing machine including a radius arm, means for mounting said arm to turn about an axis perpendicular to the object to be operated on and to swing toward and away from said object about an axis parallel with said object, and a saw carried by said arm to cut the object along a circular line around the firstnamed axis.

15. A circle sawing machine comprising a clamp, means for mounting said clamp for turning movement about an axis perpendicular to the object to be operated on, a radius arm engaging said clamp for longitudinal adjustment therein, and a saw carried by said arm for cutting the object along a circular line around said axis.

16. A circle sawing machine comprising a clamp, means for mounting said clamp for turning movement about an axis perpendicular to the object to be operated on and for tilting movement about an axis parallel with said object, a radius arm engaging said clamp for longitudinal adjustment therein, and a saw carried by said arm for cutting said object along a circular line around the firstnamed axis and movable with the corresponding portion of said arm toward and away from the object about the secondnamed axis.

17. A circle sawing machine comprising a pivot member to be disposed with its axis perpendicular to the object to be operated on, a bearing rotatable on said pivot member around said axis, a clamp mounted on said bearing for tilting movement about an axis parallel to said object, a radius arm engaging said clamp for longitudinal adjustment therein, and a saw carried by said arm to move with the arm about the firstnamed axis for cutting the object along a circular line, the saw being movable with the corresponding portion of the arm toward and away from the object about the secondnamed axis.

18. A circle sawing machine including a radius arm, means for mounting said arm to turn about an axis perpendicular to the object to be operated on and for swinging movement toward and away from the object about an axis parallel with the object, and a saw carried by said arm to cut the object along a circular line around the firstnamed axis, said saw being adjustable relatively to said arm for positioning the saw at different angles whereby the circular cut made can be at different angles relatively to the object for square and bevel cuts.

19. A circle sawing machine including a radius arm, means for mounting said arm to turn about an axis perpendicular to the object to be operated on and for swinging movement toward and away from the object about an axis parallel with the object, a saw carried by said arm to cut the object along a circular line around the firstnamed axis, and adjustable means for spacing said saw and the corresponding portion of the arm different distances from said object.

20. A circle sawing machine including a radius arm, means for mounting said arm to turn about an axis perpendicular to the object to be operated on and for swinging movement toward and away from the object about an axis parallel with the object, a saw carried by said arm to cut the object along a circular line around the firstnamed axis, said saw being adjustable relatively to said arm for positioning the saw different angles whereby the circular cut made can be at different angles relatively to the object for square and bevel cuts, and adjustable means for spacing said saw and the corresponding portion of the arm different distances from said object.

21. A circle sawing machine comprising a radius arm, means for mounting said arm for turning movement about an axis perpendicular to the object to be operated on, a saw movable with said arm for cutting the object along a circular line around said axis, means for adjusting the plane of the saw to different angular positions with reference to said object for square and bevel cuts, and means for spacing the saw and the corresponding portion of the arm different distances from the object.

22. A circle sawing machine comprising a radius arm, means for mounting said arm for turning movement about an axis perpendicular to the object to be operated on, a boxing carried by said arm, a rotary saw having an arbor journaled in said boxing, means for adjusting said boxing and arbor to different angular positions relatively to the arm and object for adjusting the saw for square and bevel cuts, and adjustable means for spacing the arbor, boxing and the corresponding portion of said arm different distances from the object.

In testimony whereof I have signed my name to this specification in the presence of two subscribing witnesses.

PERCY L. BILLINGSLEY.

Witnesses:
RALPH L. BILLINGSLEY,
HENRY R. NELSON.